Feb. 24, 1970   D. W. DENNISTON   3,497,337
PROCESS FOR MAKING GLASS FIBERS
Filed Oct. 31, 1966

INVENTOR
DONALD W. DENNISTON
BY
ATTORNEYS

United States Patent Office 3,497,337
Patented Feb. 24, 1970

3,497,337
PROCESS FOR MAKING GLASS FIBERS
Donald W. Denniston, Pittsburgh, Pa., assignor to PPG Industries Inc., a corporation of Pennsylvania
Filed Oct. 31, 1966, Ser. No. 590,940
Int. Cl. C03b 37/06, 37/02
U.S. Cl. 65—7                                    10 Claims

ABSTRACT OF THE DISCLOSURE

This invention pertains to a method of producing a mat of discontinuous glass fibers by feeding separate groups of primary glass fibers or elongated glass rods into an intensely hot, high velocity gaseous blast, said groups of fibers or rods are spaced throughout their length longitudinally of each other with respect to the direction of the blast.

---

This invention relates to the formation of glass fibers and, in particular, to an improvement in the process of producing glass fibers by means of a high temperature, high velocity, highly turbulent gaseous blast.

In the process to be described, a plurality of side-by-side continuous glass rods, generally described as primary fibers or filaments, are fed into a high velocity, high temperature, gaseous blast at an angle, on the order of 60° to 110° from the horizontal. The temperature of the gases is sufficient to heat the primaries and soften the glass. The softened glass rods are attenuated into fine diameter, discontinuous fibers by means of the velocity of the blast. The attenuated fibers are collected, as a mat or blanket on a moving conveyor and in randomly orientated arrangement. The density of the mat can be controlled by the speed of the conveyor.

The temperature of the blast is usually on the order of 2500° F. to 3500° F. and the velocity of the blast is on the order of 400 ft./sec. to 1000 ft./sec. or more. Suitable burners for performing the process are described in U.S. Patent Nos. 3,077,093 and 3,192,024.

Generally, when primary fibers are attenuated by means of such a gaseous blast, one row of side-by-side primaries is fed into the blast. This, of course, limits the quantity of blown fibers produced. In U.S. Patent No. 2,559,572, a row of primaries is fed at the same location into a blast from opposite sides thereof. However, the primaries are fed into the blast in staggered relation to each other.

In the invention to be described herein, a second row of primaries is fed into the high temperature, high velocity, turbulent blast at a location spaced downstream, i.e., in a direction of movement of the gaseous blast, of the first row of primaries, and at such a rate i.e., quantity per unit time, that they "burn-off" or are attenuated at a different level than those of the first row of primaries. Generally and preferably, the second row of primaries burn off at a level above that of the first row of primaries. The primaries in each row may be equal in number, spaced close to one another in the same relationship as when a single row of primaries is used and is alignment with one another. In other words, a staggered relationship is not necessary. Thus it is possible to materially increase the quantity of attenuated fibers produced as much as 50% or more, depending on the relationships as to quantity of glass per unit time established between the two groups of primary filaments.

Figure 2:
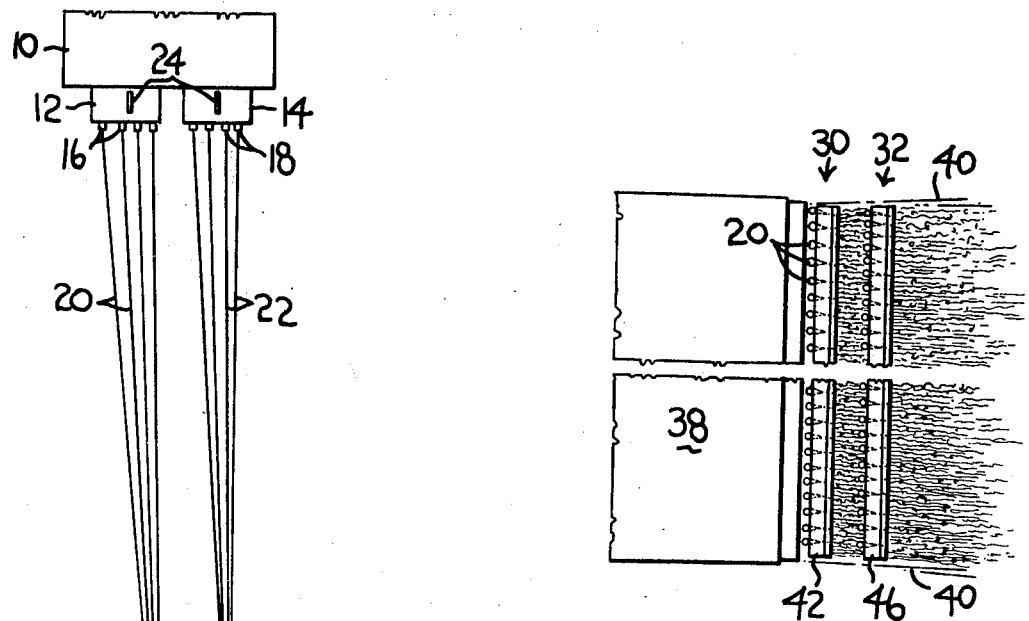
Figure 1:
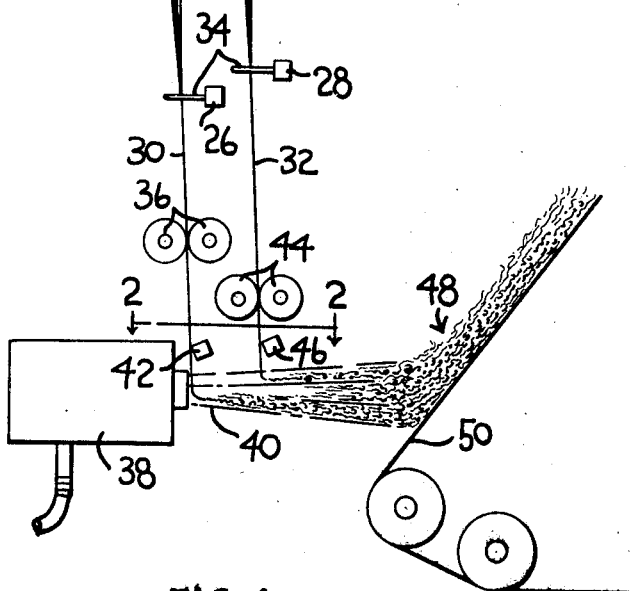

To more fully understand the invention, attention is directed to the accompanying drawing, in which, FIG. 1 is a diagrammatic elevation of a fiber-forming process using the present invention; and FIG. 2 as a sectional view taken on line 2—2 of FIG. 1.

In FIG. 1, there is shown a portion of a forehearth 10 of a glass melting furnace, conventionally formed of refractory blocks, with a pair of side-by-side bushings 12 and 14 mounted at its bottom. The bushings are formed of a platinum alloy, such as 90% by weight platinum and 10% by weight rhodium, as is done conventionally. Other alloys can be used without departing from the invention.

The bushings 12 and 14 have a plurality of tips 16 and 18, respectively, arranged in rows through which streams of glass flow to form rows of primary fibers or rods 20 and 22, respectively. There may be 200 to 400 tips or more for each bushing, thus each row of primaries will include 200 to 400 or more rods.

Each bushing is heated electrically as described in U.S. Patent No. 2,965,696, and is provided with bus bars or terminals 24 through which electrical current is passed for this purpose. The temperature and viscosity of the glass as it flows through the bushing is controlled by the current passing through the bushing. With separate terminals, the temperature of the bushings 12 and 14 are independently controlled.

A single bushing may be used with its production split into two groups or with different sized tips. However, the separate electrical controls of a pair of bushings lend flexibility to the process.

The primary fibers 20 and 22 are aligned in guides 26 and 28, respectively, so as to form a first straight row 30 and primaries and a second, straight row 32 of primaries (see especially FIG. 2), spaced downstream from the first row of primaries. Preferably the primary rows are parallel to each other, especially near the blast; however, they may be at different angles with respect to the blast, so as long as the angle of each is between 60° and 110° with respect to the center line of the blast. As in conventional, single row process, the primaries are spaced, as for example, about .040 to .060 inch on centers by the guide. Of course the spacing may be greater than .060 inch, if the necessity dictates and if very fine primaries are used, the spacing may be even less. The guides 26 and 28 may be comb guides, each having a plurality equally spaced of pins 34 extending from a support. The pins 34 are preferably flexible to permit passage of stones in the primaries, if such are present. The guides are orientated, so that an operator can easily feed the primaries between the pins upon start of the process.

The first row 30 of primaries is drawn downwardly by a pair of rubber covered cot wheels or rolls 36, one of which is driven, and is delivered closely adjacent a burner 38 into the blast 40 of the burner 38. The burner may have a throat or outlet approximately 15 inches wide by ¾ inch high. The angle of feed is generally 60° to 110° from the center line of the blast, it having been found that the 80° to 90° angle performs most efficiently. A stabilizer bar 42, usually having dimensions of ¼ inch or less in one direction, closely adjacent the burner, as on the order of ⅛ to ¼ inch from the burner, stabilizes the primaries in the blast. While the bar 42 is shown as square in section, any section may be used.

In a similar manner, the second row 32 of primaries is drawn downwardly by a pair of rubber covered cot wheels or rolls 44, one of which is driven, and is delivered downstream of the first row of primaries into the blast 40. A stabilizer bar 46 is associated with the second row of primaries. This bar is similar to the bar 42 and may be of any desired section.

The two rows of primaries are preferably parallel to one another, as stated before, and on the order of two inches apart. The cot rolls are relatively small in diameter, as on the order of 1½ inches in diameter and rotate at about 25 to 60 r.p.m.

The heat of the blast 40 softens the ends of the primaries and draws the glass out as very fine discontinuous fibers which are collected as a mat or fluffy blanket 48 on a foraminous conveyor 50 according to conventional practice. A thermosetting binder may be applied to the mat 48 and the mat cured and compacted with heat and pressure in a conventional manner.

As can be readily understood, the rate of drawing the second row of primaries can be controlled independently of that of the first row of primaries, as for example by using a different heat input to the bushing, thus producing a finer primary or a like primary at a different speed, or by rotating the cot rolls 44 at a rate different from the cot rolls 36, or by construction of the bushing 14 with different sized tips than the bushing 12. In any event, it has been found that material improvements in production (quantity of fiber produced by a blast burner per unit time) can be obtained when the rate of the second row of primaries is up to 70% of the rate (quantity of glass per unit time generally measured as pounds of glass per tip) of the first row of primaries. Preferably, the rate of the second row of primaries is about 50% of the rate of the first row of primaries. In other words, the pounds of glass per tip for the second row of primaries is a percentage of the pounds of glass per tip for the first row of primaries. This may be accomplished by feeding rate, primary size or mixtures thereof. As an example, the primaries 20 of the first row 30 may be fed at a rate of 0.3 to 0.4 pound per tip while those of the primaries 22 of the second row may be fed at a rate of 0.15 to 0.2 pound per tip.

By proceeding as thus described the second row of primaries, i.e., those delivered into the hot, high velocity gaseous blast, "burn-off" or are attenuated into the fine, discontinuity fibers, at a position above that of "burn-off" of the first or upstream row of primaries, and generally, the diverging, blasted fibers from the rows do not interfere with one another at their zones of formation. However, because of the turbulence of the blast, there is a substantial mixing of the fibers from the two sources, so that the blanket is an integrated mass of the fibers.

One of the prime features of this invention is the fact that for any given primary diameter, the spacing of the primaries in the first or upstream row is the same whether or not the second row of primaries is present. Thus the production of fibers from the second or downstream row of primaries is a bonus, utilizing more efficiently the heat, etc., of the blast from the burner. Also, the primaries in the second row of primaries are generally spaced the same distance apart as those in the first row and no staggering of the rows as required. In the event that the rate of production (pounds per unit time per tip) of the second row of primaries is controlled or determined by fiber diameter, then more fibers per row may be used. In any event the spacing of the primaries is chosen to prevent their adherence to each other and interruption of the process.

In order to produce relatively wide mats, several bushings and burners are laterally arranged in side-by-side relationship, so as to each discharge fibers on the conveyor, which is constructed to accommodate the desired mat width.

I claim:
1. The process of making glass fibers from elongated rods of glass which comprises,
producing an intensely hot, high velocity gaseous blast
feeding separate groups of glass rods endwise at different locations and in the same general direction into the blast, the rods in each group being spaced laterally of each other and the rods of one group being spaced throughout their lengths longitudinally in the direction of the blast from the rods in another group, and
attenuating the rods in each group to form fibers by the heat and force of the blast.

2. A process of making fine discontinuous glass fibers comprising,
drawing a plurality of continuous glass fibers from a source of molten glass
arranging said fibers into groups of laterally spaced fibers
producing an intensely hot, high velocity gaseous blast
feeding said groups separately endwise at different locations and in the same general direction into the blast, one group being spaced throughout their lengths longitudinally of another group with respect to the direction of the blast, and
attenuating the fibers in each group to form fine, discontinuous glass fibers by the heat and force of the blast.

3. A process of making a mat of fine, discontinuous glass fibers comprising,
drawing a plurality of continuous glass fiber primaries from a source of molten glass
arranging said primaries into groups of laterally spaced primaries,
producing an intensely hot, high velocity gaseous blast,
feeding said groups separately endwise at different locations and in the same general direction into the blast, one group being spaced throughout their length longitudinally of another group with respect to the direction of the blast,
attenuating said primaries in each group to form fine, discontinuous glass fibers by the heat and force of the blast, and
collecting said fine, discontinuous glass fibers as a mat.

4. A process of making a mat of fine, discontinuous glass fibers comprising,
drawing a plurality of continuous glass fiber primaries from a source of molten glass
arranging said primaries into two groups of laterally spaced primaries
producing an intensely hot, high velocity gaseous blast,
feeding a first group of primaries into said blast closely adjacent the source thereof
feeding a second group of primaries into the blast downstream of the first group of primaries and spaced longitudinally thereof
attenuating said primaries in each group to form fine, discontinuous glass fibers by the heat and force of the blast, and
collecting said fine, discontinuous glass fibers as a mat.

5. A process as recited in claim 4 wherein the quantity of glass in said second group of primaries per unit time is less than that in said first group of primaries.

6. A process as recited in claim 5 wherein the quantity of glass in said second group of primaries per unit time is up to 70% of that in said first group of primaries.

7. A process as recited in claim 5 wherein said primaries of said second group are smaller in diameter than those of said first group.

8. A process as recited in claim 5 wherein the primaries of said second group are fed into said blast at a different velocity from those of said first group.

9. A process as recited in claim 8 wherein the primaries of said second group are fed into said blast at a less velocity than those of said first group.

10. A process as recited in claim 9 wherein the primaries of said second group are the same diameter as those in said first group.

References Cited

UNITED STATES PATENTS

| | | | |
|---|---|---|---|
| 2,559,572 | 7/1951 | Stalego | 65—7 |
| 2,884,681 | 5/1959 | Labino | 65—7 X |
| 3,019,078 | 1/1962 | Roberson | 65—1 X |
| 3,265,476 | 8/1966 | Roberson | 65—1 |

S. LEON BASHORE, Primary Examiner

ROBERT L. LINDSAY, Jr., Assistant Examiner

U.S. Cl. X.R.

65—13